3,138,568
METHOD OF FORMING MULTICOLOR COATING COMPOSITIONS AND RESULTING PRODUCTS
Russell L. Sears, Detroit, Mich., assignor to Rinshed-Mason Company, Detroit, Mich., a corporation of Michigan
No Drawing. Filed Apr. 9, 1962, Ser. No. 185,834
3 Claims. (Cl. 260—29.6)

This invention relates to a multicolor coating composition, and more particularly to a coating composition which, when applied to a surface, will provide a solid color background film having deployed thereon separate, differently colored spots of paint.

Multicolor coating compositions have become increasingly popular in recent years. A practical method for manufacturing such coating compositions is disclosed in U.S. Patent No. 2,591,904. Such coating compositions comprise a dispersion of discrete particles or drops of coating material in an aqueous dispersing medium. The aqueous dispersing medium contains a suspension stabilizer to hold the particles of coating material in suspension. The coating material may be any of a wide variety of conventional compositions, such as enamels, lacquers and oil base paints. The particles are of relatively large size, most of them being larger than 50 microns in size. When such a composition is applied to a surface, preferably by spraying, the particles of coating material upon striking the surface burst and form spots of color on the surface. The area between the spots of color is not coated, the aqueous dispersing medium eventually evaporating and leaving a bare surface. If it is desired to coat an entire surface with a multicolor paint, several applications must be applied to the surface in order to fill the areas between the spots.

While the above type of multicolor paints have proved satisfactory for many purposes, it has been found that for some applications a conventional multicolor paint is not satisfactory. One of the disadvantages of conventional multicolor paints is that the hiding ability is relatively low because of the uncoated areas between the spots. Consequently, a separate background film must first be applied to the surface in order to fill the areas between the spots with paint or several applications of the multicolor paint must be made in order that the surface will be completely covered. When several applications of the multicolor paint are made, there is the additional disadvantage that there is no separation of the spots. Such separation is considered desirable from the visual standpoint.

Additionally, conventional multicolor paints cannot be applied directly to a ferrous material such as steel because the ferrous material would rust. Even when several coats of the conventional multicolor paints are applied to a ferrous surface, so as to apparently entirely cover the surface, there are still microscopic pores between each of the spots. Such microscopic pores lead to what is termed "flash rusting" which is an almost immediate rusting at the points of the microscopic pores. Another problem with conventional multicolor paints is that they will not adhere to certain slick surfaces such as resin-reinforced fiberglass laminates or hard, slippery industrial finishes such as baked enamels, lacquers and certain primers. With reference to this latter point, multicolor paints have been widely used to coat the interior surfaces of automobile trunks. Conventionally, the interior trunk surface is the last surface which is painted in the manufacture of an automobile. In the prior painting of the automobile body with a lacquer or enamel, there is usually a leakage of the sprayed coating composition into the trunk area to partially coat the interior surface of the trunk. As a consequence, when a conventional multicolor paint is applied to the interior surface of the trunk, the portions of the trunk interior which have been inadvertently coated with the exterior automobile paint will not be properly coated with the multicolor paint. A further consideration with reference to conventional multicolor paints is that there is a very objectionable odor which may be hazardous to the health of the worker using the paint if the paint is applied in an unventilated space, for example, the interior surface of an automobile trunk. The odor results from the large amount of organic solvents in the paint droplets of the multicolor paint. The droplets form a relatively thick film and when several applications of the material are applied to the same surface, a considerable amount of organic solvent is present which upon evaporation causes the odor and health problem.

The above problems are solved by the present invention through the provision of a coating composition which incorporates a modified multicolor coating composition in admixture with a latex-type coating composition which when applied to a surface results in a solid background of the latex-type composition with the paint spots of the multicolor composition dispersed thereon. The coating composition is slightly alkaline and can be applied to bare steel surfaces without danger of rust. It can also be applied to slick surfaces such as resin-reinforced fiberglass laminates or hard slippery industrial finishes, and it does not have an objectionable odor.

The present coating composition is prepared by first separately formulating a latex-type coating composition and a multicolor coating composition. These two compositions are then mixed together to form the final composition.

The preferred latex emulsion composition contains as a vehicle an acrylic material which is a copolymer of methyl methacrylate and ethyl acrylate in the ratio of approximately two parts by weight of methyl methacrylate to one part by weight of ethyl acrylate. Small amounts of other materials such as ethyl methacrylate, may be copolymerized therewith to result in desired properties of the copolymer. In the practice of the invention, this copolymer is polymerized in water by conventional means to form a latex of discrete emulsified particles, the latex being added to a pigment dispersion to form a latex emulsion background color phase.

This particular acrylic latex has been found to be desirable for a number of reasons. Firstly, it is nonionic and tends to promote a stable final multicolor composition. Secondly, it has the desired degree of hardness, the hardness being a medium hardness which results in a film which has good flexibility but is not tacky. Additionally, this latex material does not tend to wet the relatively large droplets of coating material in the final composition. Such wetting causes burying of the droplets with the result that when the composition is applied to a surface, distinct spots of color do not appear.

The aqueous dispersion of large discrete particles of coating material is preferably prepared in accordance with the method taught in U.S. Patent No. 2,591,904. This method comprises adding to an aqueous dispersing medium containing a stabilizing agent a coating material that is relatively immiscible with said solution. More than one coating material may be added to result in two or more differently colored paint droplets in the composition. The aqueous dispersing medium is gently agitated while the coating composition is added to form a dispersion of relatively large particles of the coating material (the majority of particles being over 50 microns in size). Agitation is stopped before emulsion size particles are formed. The amount of stabilizing agent utilized is that just sufficient to prevent appreciable coalescence of the particles but is insufficient to cause emulsification.

The above composition has been modified in accordance with the present invention to provide a composition which is stable in the final composition. The modification resides principally in the formulation of the coating material which is added to the aqueous dispersing medium. Firstly, the resin material used as a vehicle in the coating material is a copolymer of vinyl toluene and butadiene in an amount of from 80 to 90% by weight of vinyl toluene and from 10 to 20% by weight of butadiene. Secondly, a solvent has been selected for the vinyl toluene-butadiene copolymer which is substantially odorless and will just barely dissolve this material. It has been found that if the solvent is too strong, the droplets will not be stable when admixed with the latex emulsion background color phase. The particular solvent mixture which has been found to be most effective is approximately 92% by weight of low odor mineral spirits having a K.B. value of between 25 and 30, and about 8% by weight of aromatic hydrocarbons. The aromatic hydrocarbons have a K.B. value of 90–95, a mixed aniline point of 59, a flash point of 118° F., a boiling range of 161–177° C., a refractive index of 1.4982, and a specific gravity of 0.875.

An example of a coating composition prepared in accordance with the present invention is as follows:

*Latex Emulsion Background Color Phase*

| | Parts by weight |
|---|---|
| Potassium tripolyphosphate | 7.8 |
| Di-tertiary acetylenic glycol | 1.9 |
| Water | 94.0 |
| Hydroxy ethyl cellulose, 4000 cps. | 1.0 |
| Mica pigment | 41.6 |
| Calcium carbonate | 59.2 |
| Rutile titanium dioxide | 114.3 |
| Lithopone | 115.3 |
| Carbon black | 6.0 |
| Yellow iron oxide | 1.0 |
| Brown iron oxide | 1.5 |
| Total parts by weight | 443.6 |

The above materials were mixed together and ground overnight in a pebble mill to 5–5.5 N.S. to form a pigment dispersion. In this dispersion, the potassium tripolyphosphate and di-tertiary acetylenic glycol act as pigment dispersing agents, the water serves as a solvent, the hydroxy ethyl cellulose acts as a thickener and protective colloid to keep the pigment from re-flocculating, and the remaining ingredients serve as pigments.

The following ingredients were added to the above pigment dispersion to form the final latex composition:

| | Parts by weight |
|---|---|
| Ethylene glycol monoethyl ether | 18.5 |
| 28% water solution of ammonia | 0.9 |
| Acrylic latex (46% solids, 54% water) | 615.8 |
| 18% water solution of phenyl mercury acetate | 1.0 |

These materials were mixed together to form a final composition of 1079.8 parts by weight. The acrylic latex was the methyl methacrylate-ethyl acrylate copolymer water emulsion previously discussed with the copolymer having 2 parts of methyl methacrylate to 1 part of ethyl acrylate. In the final emulsion the pigment and acrylic copolymer formed discrete emulsion size particles of coating material in an aqueous dispersing medium. The size of the majority of the coating material particles in the emulsion is less than 2 microns.

The pH of the above composition is preferably adjusted to 9.0–9.3 and the viscosity is preferably adjusted to 65 Krebs Units. The color of this composition is a dark gray.

In this composition, the phenyl mercury acetate is a bactericide, the ethylene glycol monoethyl ether is a freezing point depressant and the ammonia acts to control the pH of the composition.

The aqueous dispersion of paint droplets was prepared separately from the latex emulsion. A white enamel was first prepared and then added to an aqueous outer phase containing a suspension stabilizer. The white enamel was prepared as follows:

| | Parts by weight |
|---|---|
| Aromatic hydrocarbons | 17.56 |
| Low odor mineral spirits | 202.07 |
| Vinyl toluene-butadiene copolymer | 27.5 |

The vinyl toluene-butadiene copolymer was dissolved in the solvents. Then 13.72 parts by weight of bentonite clay was added and the mixture agitated for ten minutes. Then, 13.72 parts by weight of ethyl alcohol was added to this mixture to cause the mixture to gel. After agitation for ten minutes, the following materials were added:

| | Parts by weight |
|---|---|
| Zinz naphthenate | 12.66 |
| Titanium dioxide | 65.89 |
| Colloidal silica | 27.45 |
| Calcium carbonate | 104.32 |
| Vinyl toluene-butadiene copolymer | 164.74 |
| Low odor mineral spirits | 101.04 |
| Aromatic hydrocarbons | 8.79 |

This mixture was dispersed to 5.0 N.S. on a roller mill and then the following materials were added thereto:

| | Parts by weight |
|---|---|
| Low odor mineral spirits | 25.23 |
| Aromatic hydrocarbons | 2.19 |

The viscosity of the mixture at this point was approximately 130 K.U. The mixture was then allowed to set for several hours in order to become stable and final viscosity was adjusted to 129 K.U. by the addition of 66.99 parts by weight of low odor mineral spirits and 5.80 parts by weight of aromatic hydrocarbons. The final viscosity should be adjusted to 129 plus or minus 2 K.U. In this composition, the aromatic hydrocarbons and low odor mineral spirits were those previously discussed and served to dissolve the vinyl toluene-butadiene copolymer which was the copolymer previously discussed, having 85% by weight of vinyl toluene to 15% by weight of butadiene.

The aqueous outer phase was then prepared as follows:

| | Parts by weight |
|---|---|
| Methyl cellulose, 4000 cps. | 4.75 |
| Water | 827.69 |
| Water dispersible bentonite clay | 1.93 |
| Sodium sulphate | .75 |

The white enamel was then slowly added under gentle agitation to the aqueous outer phase to form a suspension of small, discrete white enamel droplets, the majority of which were over 50 microns in size.

This composition was then added to the latex emulsion background color phase under gentle agitation to result in a final composition which contained a continuous outer phase of latex background paint and an inner phase of discrete white enamel flecks or droplets. When this composition was sprayed from a conventional spray gun, a gray-white multicolor finish was obtained in one coat.

The final composition preferably has from 20 to 30% by weight of the large discrete particles of coating material to 80–70% by weight of the small emulsion size particles of the latex coating material.

Having thus described my invention, I claim:

1. The method of forming a stable multicolor coating composition having a continuous outer phase of latex emulsion background paint and an inner phase of relatively large paint droplets comprising the steps of separately (1) emulsifying in water a pigment and a copolymer of methyl methacrylate and ethyl acrylate to yield small discrete emulsified particles consisting essentially of said pigment and copolymer the majority of which are under two microns in size, and (2) providing a paint including a pigment and a copolymer of vinyl toluene and butadiene, adding said paint under mild agitation to an aqueous dispersing medium containing a stabilizing agent to form relatively large droplets of said paint most of which exceed about 50 microns in size, then admixing the materials of (1) and (2) in the ratio of said small discrete emulsified particles to said relatively large paint droplets of from 80:20 to 70:30 parts by weight, and mildly agitating said admixture to avoid emulsification of said relatively large paint droplets and provide a smooth homogeneous multicolor coating composition.

2. The method of forming a stable multicolor coating composition comprising the steps of separately (1) emulsifying in water a pigment and a copolymer of methyl methacrylate and ethyl acrylate, said copolymer having a ratio of methyl methacrylate to ethyl acrylate of about 2:1 parts by weight, said emulsification yielding small discrete emulsified particles consisting essentially of said pigment and copolymer the majority of which are under two microns in size, and (2) providing a paint including a pigment and a copolymer of vinyl toluene and butadiene, the ratio of vinyl toluene to butadiene being about from 80:20 to 90:10 parts by weight, adding said paint under mild agitation to an aqueous dispersing medium containing a stabilizing agent to yield relatively large paint droplets most of which exceed about 50 microns in size, then admixing the materials of (1) and (2) in the ratio of said small discrete emulsified particles to said relatively large paint droplets of from 80:20 to 70:30 parts by weight, and mildly agitating said admixture to avoid emulsification of said relatively large paint droplets and provide a smooth, homogeneous multicolor coating composition.

3. The product prepared in accordance with the method of claim 1.

No references cited.